M. BAKER.
DISHWASHER.
APPLICATION FILED JAN. 17, 1921.

1,403,999.

Patented Jan. 17, 1922.

Inventor
Max Baker

UNITED STATES PATENT OFFICE.

MAX BAKER, OF RICHMOND, VIRGINIA.

DISHWASHER.

1,403,999.   Specification of Letters Patent.   Patented Jan. 17, 1922.

Application filed January 17, 1921. Serial No. 437,869.

*To all whom it may concern:*

Be it known that I, MAX BAKER, a citizen of the United States, residing at Richmond, in the county of Henrico and State of Virginia, have invented certain new and useful Improvements in Dishwashers, of which the following is a specification.

This invention has for its object the provision of a simple, inexpensive and efficient apparatus by the use of which dishes may be rapidly and thoroughly washed and dried. The invention is illustrated in the accompanying drawings, in which—

Figure 1:
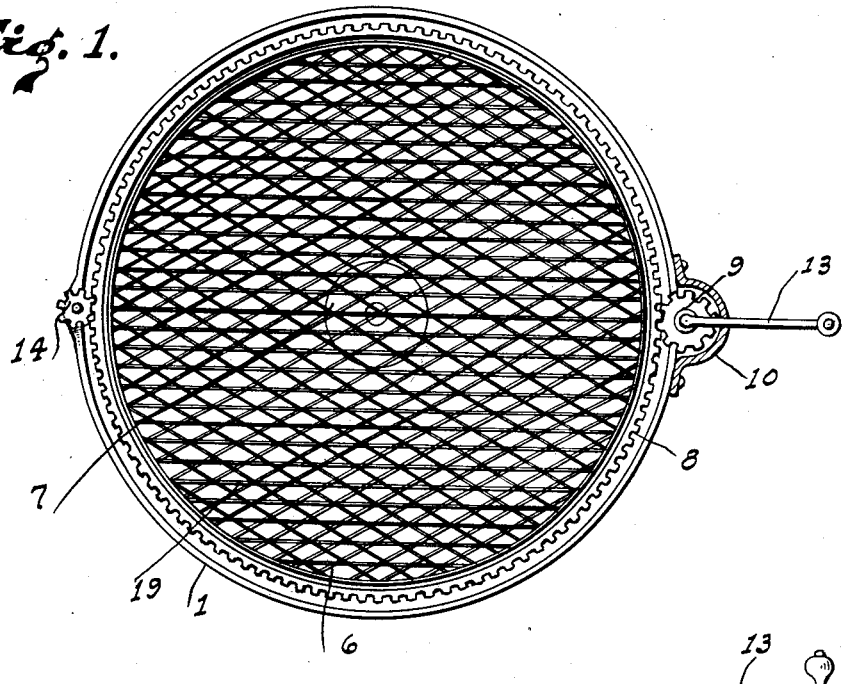
Figure 1 is a plan view of the improved machine.
Figure 2:
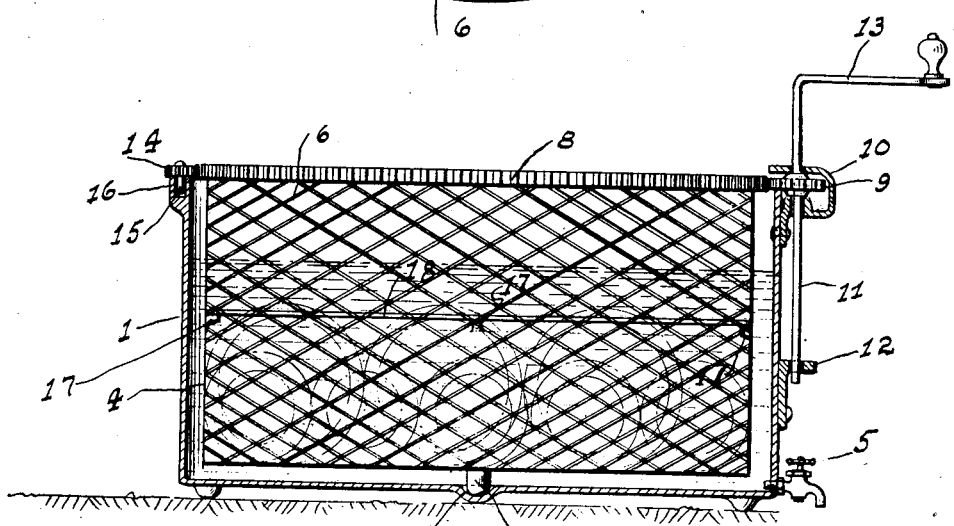
Fig. 2 is a view partly in side elevation and partly in vertical section.

In carrying out the invention, I employ a tank 1 which is preferably cylindrical and may be supported in any preferred or convenient manner. At the center of the bottom of the tank is formed a socket 2 which receives a stud pivot 3 on the bottom of a dish basket 4. The tank is further provided with a drain cock 5 so that the water may be drawn therefrom after it has been used and this drain cock may be of any well-known form. The basket 4 is preferably cylindrical in form and constructed of wires 6 which are interwoven so as to produce a strong and light structure through which the water may freely circulate. The pivot stud 3 will preferably be carried by a plate 7 of metal at the center of the basket so that the bottom of the basket will be reinforced around the pivot and not be apt to be bent and lose its utility through the action of the stud. Around the upper edge of the basket, I provide a gear or rack 8 which meshes with a pinion 9 housed within a gear case 10 which is secured upon the side of the tank near the top of the same, as clearly shown in Fig. 2. The driving shaft 11 is journaled in the top and bottom of the gear case and also in a bracket 12 secured on the side of the tank near the bottom thereof so that the shaft will be firmly supported and cannot be readily distorted. The upper end of the shaft is formed into or provided with a handle 13 whereby it may be rotated. Diametrically opposite the pinion 9, an idler 14 is provided to mesh with the rack 8 and thereby counteract any tendency of the basket to tilt while in use. The idler pinion 14 is carried by a shaft or pin 15 supported in an offset 16 on the tank.

Within the basket, I provide lugs or flanges 17 upon which is supported a rack consisting of a circular rim 18 and parallel wires or light rods 19 secured to and extending across said rim. In the accompanying drawings, I have shown only one rack but it will, of course, be understood that a plurality of the racks may be employed so that dishes of various heights may be supported on edge within the basket.

In the use of the apparatus, the dishes to be cleaned are placed in the basket with plates and similar articles standing on edge and held against falling by having their upper portions engaged between the rods or wires 19. Hot water containing soap or some other detergent is poured into the tank so as to completely cover all the dishes in the basket and the shaft 11 is then rotated so as to impart a circular motion to the basket. The rotation of the basket will cause the water to flow around and splash upon the dishes and act upon the entire surface of each article so that all the dirt will be removed therefrom. After the basket has been rotated a few minutes and the grease and dirt removed from the plates, the rotation is stopped and the water drained off. Hot clear water is then poured over the dishes and the basket again rotated so that the dishes will be thoroughly rinsed. This water is then drawn off and the basket then rapidly rotated without any water therein, the slight surface water remaining upon the dishes being thrown off by centrifugal action and the dishes consequently quickly and thoroughly dried. It has been demonstrated that dishes dried in this manner are more completely dried and take a higher luster than is possible when they are wiped by hand according to the general custom.

My device is exceedingly simple in the construction and arrangement of its parts and may be produced at a cost which will permit it to be placed in every household. It may be operated very easily and will materially expedite the work of cleaning dishes and relieve such operation of the drudgery now incident thereto. The rack which is fitted within the basket prevents the plates from falling and breaking and also serves to reinforce and brace the basket against lateral collapse. The manner of mounting the basket within the tank permits the basket to rotate very rapidly with a minimum amount of friction and without any lateral oscillation.

Having thus described the invention, what is claimed as new is:

An apparatus for the purpose set forth comprising a tank, a foraminous basket disposed concentrically within the tank and mounted for rotation therein, a gear case on the side of the tank at the top thereof, a bracket on the side of the tank below the gear case, a driving shaft disposed vertically through said case and in said bracket, a pinion on said shaft housed within the gear case, an exterior rack on the side of the basket at the top edge thereof meshing with said pinion, and an idler gear mounted upon the upper edge of the tank diametrically opposite said pinion and meshing with said rack.

In testimony whereof I affix my signature.

MAX BAKER. [L. S.]